United States Patent
Vincent et al.

(10) Patent No.: US 7,358,301 B2
(45) Date of Patent: Apr. 15, 2008

(54) LATEX PARTICLES HAVING INCORPORATED IMAGE STABILIZERS

(75) Inventors: Kent Vincent, Cupertino, CA (US); Sivapackia Ganapathiappan, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 379 days.

(21) Appl. No.: 10/322,032

(22) Filed: Dec. 17, 2002

(65) Prior Publication Data

US 2004/0116596 A1    Jun. 17, 2004

(51) Int. Cl.
*C08L 75/04* (2006.01)

(52) U.S. Cl. .............. 524/589; 524/590; 524/813; 524/839; 523/160; 523/161

(58) Field of Classification Search .......... 524/589, 524/590, 813, 839; 523/160, 161
See application file for complete search history.

(56) References Cited

U.S. PATENT DOCUMENTS

| | | | |
|---|---|---|---|
| 4,264,748 A * | 4/1981 | Oriel et al. | 525/109 |
| 4,495,229 A | 1/1985 | Wolf et al. | |
| 4,593,064 A | 6/1986 | Hosch | |
| 4,742,097 A * | 5/1988 | Turpin et al. | 523/407 |
| 5,607,482 A | 3/1997 | Reiff et al. | |
| 5,849,837 A | 12/1998 | Wei et al. | |
| 5,892,037 A | 4/1999 | Steinmann | |
| 6,120,901 A * | 9/2000 | Ojeda | 428/421 |
| 6,340,719 B1 * | 1/2002 | Goeb et al. | 522/174 |
| 6,417,249 B1 | 7/2002 | Nguyen et al. | |
| 6,538,047 B1 * | 3/2003 | Miyabayashi | 523/160 |
| 6,590,012 B2 * | 7/2003 | Miyabayashi | 523/160 |
| 6,819,467 B2 * | 11/2004 | Lynam | 359/275 |
| 7,030,176 B2 * | 4/2006 | Nohr et al. | 523/201 |
| 2003/0027078 A1 * | 2/2003 | Kang et al. | 430/270.1 |

FOREIGN PATENT DOCUMENTS

| | | |
|---|---|---|
| EP | 1108757 | 6/2001 |
| WO | WO 98/45348 A1 * | 10/1998 |

OTHER PUBLICATIONS

Harold G. Fravel et al, "Preparation, Polymerization, and Evaluationof Blocked Isocyanatoethyl Methacrylate", Ind. Eng. Chem. Prod. Res. Dev, 1984, 23, pp. 586-590.
T. Regulski et al, "Isocyantoethyl Methacrylate III: Polymerization, Formulation and Evaluation of Blocked IEM Derivatives", 1984.

* cited by examiner

*Primary Examiner*—Ling-Sui Choi

(57) ABSTRACT

A composition and method of associating stabilizer functionalities with latex particulates is provided. The composition can comprise a latex particulate configured for inclusion in an ink-jet ink to provide improved humidfastness of an image printed by the ink-jet ink, wherein the latex particulate has a molecular weight from 10,000 Mw to 10,000,000 Mw, and has a particle size from 10 nm to 2 μm; and an image stabilizer configured for improving durability of the image, wherein the image stabilizer is bound to or otherwise associated with the latex particulate. The method can comprise the steps of coupling a polymerizable monomer with a stabilizing agent reactive with the polymerizable monomer, thereby forming a stabilizer precursor-containing monomer; polymerizing the stabilizer-containing monomer to form a latex particulate; and decoupling the stabilizing agent from the latex particulate.

13 Claims, No Drawings

LATEX PARTICLES HAVING INCORPORATED IMAGE STABILIZERS

FIELD OF THE INVENTION

The present invention relates generally to ink-jet printing. More particularly, the present invention relates to color stabilization for latex-based inks, coatings, and/or paints.

BACKGROUND OF THE INVENTION

Computer printer technology has evolved to a point where very high-resolution images can be transferred to various types of media, including paper. One particular type of printing involves the placement of small drops of a fluid ink onto a media surface in response to a digital signal. Typically, the fluid ink is placed or jetted onto the surface without physical contact between the printing device and the surface. Within this general technique, the specific method that the ink-jet ink is deposited onto the printing surface varies from system to system, and can include continuous ink deposit and drop-on-demand.

With regard to continuous printing systems, inks used are typically based on solvents such as methyl ethyl ketone and ethanol. Essentially, continuous printing systems function as a stream of ink droplets that are ejected and directed by a printer nozzle. The ink droplets are directed additionally with the assistance of an electrostatic charging device in close proximity to the nozzle. If the ink is not used on the desired printing surface, the ink is recycled for later use. With regard to drop-on-demand printing systems, the ink-jet inks are typically based upon water and solvents such as glycols. Essentially, with these systems, ink droplets are propelled from a nozzle by heat or by a pressure wave such that all of the ink droplets ejected are used to form the printed image.

There are several reasons that ink-jet printing has become a popular way of recording images on various media surfaces, particularly paper. Some of these reasons include low printer noise, capability of high-speed recording, and capability of multi-color recording. Additionally, these advantages can be obtained at a relatively low price to consumers.

Though there has been great improvement in ink-jet printing technology, as described previously, there are still improvements that can be made in many areas. Poor color durability has partially been alleviated by the incorporation of stabilizer molecules, or photo-stabilizers, into ink-jet inks. However, ink-jet ink chemistry itself as well as ink-jet ink/print media interaction have both contributed to the separation of colorant, i.e., dyes and/or pigments, and photo-stabilizers upon printing. With respect to ink-jet ink chemistry, the majority of commercial ink-jet inks are water-based. Thus, their constituents are generally water-soluble, as in the case with many photo-stabilizers and dyes, or water dispersible, as in the case with pigments. Furthermore, ink-jet inks have low viscosity (typically 5 cps or less) to accommodate high frequency jetting and firing chamber refill processes common to ink-jet pens. The high jetting shear force imposed on the ink can cause an initial separation of a dye, another liquid vehicle component, and/or a photo-stabilizer components of the ink-jet ink. Further, with respect to the relationship between a photo-stabilizer-containing ink-jet ink and a print media sheet, e.g., porous coated media sheet, additional and more permanent separation of the ink-jet ink components can occur chromatographically as the ink-jet ink penetrates the media surface. Thus, there exists challenges related to utilizing photo-stabilizers as effectively as possible within ink-jet ink formulations.

In addition to color and general image fade, ink-jet prints have also been known for poor durability when exposed to water or high humidity. This results from the use of water-soluble and water dispersible colorants within the water-based ink. There has been great improvement in the area of water durability of ink-jet inks through incorporation of certain ink-jet compatible latex polymers. The latex can consist of small micron or submicron hydrophobic polymeric particles of high molecular weight that are dispersed in the aqueous ink-jet ink. When printed as part of an ink-jet ink, a latex component of the ink can form a film on a media surface, entrapping and protecting the colorant within the hydrophobic print film.

SUMMARY OF THE INVENTION

It has been recognized that it would be advantageous to develop ink-jet ink compositions that exhibit improved color and water durability. Specifically, it would be advantageous to provide stabilizer-bound latex particulates for use in ink-jet ink formulations, such that the benefits of the presence of the latex can be realized, and the stabilizers bound to the latex particulates can be used to improve image durability as well as to prevent colorant-stabilizer separation.

In one aspect, the invention provides a method of associating stabilizer functionalities with latex particulates. The method can comprise the step of forming a stabilizer precursor-containing monomer by coupling a polymerizable monomer with a stabilizing agent reactive with the polymerizable monomer. After forming the stabilizer precursor-containing monomer, the step of polymerizing the stabilizer precursor-containing monomer to form a stabilizer precursor-containing latex particulate, and decoupling the stabilizer precursor-containing latex particulate to form an associated latex particulate and stabilizing agent can be carried out. In one embodiment, the polymerizable monomer can comprise an isocyanate group. Further, the stabilizing agent can comprise a —NH, —SH, or —OH, or —CH functional group, and the coupling can occur by a reaction between the isocyanate group and the —NH, —SH, —OH, or —CH functionality, thereby blocking the isocyanate group and the —NH, —SH, —OH, or —CH functionality from interfering with the polymerizing step. The decoupling can produce a stabilizing moiety covalently bound to the latex particulate, and/or the stabilizing agent can become entrapped in the latex particulate.

In an alternative embodiment, a latex particulate for providing improved image durability such as humidfastness and lightfastness in ink-jet printing applications can include latex-bound stabilizer particulates. Specifically, the composition can include a latex particulate configured for inclusion in an ink-jet ink to provide improved humidfastness of an image printed by the ink-jet ink, wherein the latex particulate has a molecular weight from 10,000 Mw to 10,000,000 Mw, and has a particle size from 10 nm to 2 µm. The latex particulate can also include an image stabilizer configured for improving durability of the image, wherein the image stabilizer is bound to the latex particulate. By bound, the image stabilizer can either be a stabilizing moiety covalently bound to the latex particulate, and/or the image stabilizer can be a stabilizing agent entrapped within the latex particulate.

Additional features and advantages of the invention will be apparent from the detailed description that follows which illustrates, by way of example, features of the invention.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

As used herein, "effective amount" refers to the minimal amount of a substance or agent, which is sufficient to achieve a desired effect. For example, an effective amount of a "liquid vehicle" is the minimum amount required for use in an ink composition or a fixer composition of the present invention, while maintaining properties in accordance with embodiments of the present invention.

As used herein, "liquid vehicle" refers to the fluid in which colorants and stabilizer-bound latex particulates or colloids are dispersed to form ink-jet inks in accordance with the present invention. Many liquid vehicles and vehicle components are known in the art. Typical ink vehicles can include a mixture of a variety of different agents, such as surfactants, solvents, co-solvents, buffers, biocides, sequestering agents, viscosity modifiers, surface-active agents, and water.

"Colorant" can include dyes and/or pigments. Dyes are typically water soluble and are therefore desirable for use in many embodiments. However, pigments can also be used in other embodiments. Pigments that can be used include self-dispersed pigments and polymer dispersed pigments. Self-dispersed pigments included those that have been chemically surface modified with a charge or a polymeric grouping. This chemical modification aids the pigment in becoming and/or substantially remaining dispersed in a liquid vehicle. The pigment can also be a polymer-dispersed pigment that utilizes a dispersant (which can be a polymer or an oligomer, or a surfactant) in the liquid vehicle and/or in the pigment that utilizes a physical coating to aid the pigment in becoming and/or substantially remaining dispersed in a liquid vehicle.

"Image stabilizer" or simply "stabilizer" can be any molecule or functional moiety that acts to stabilize printed images, such as ink-jet printed images. These image stabilizers are particularly effective in increasing image durability of printed ink components, including ink colorants. Typically, image stabilizers can act as free-radical inhibitors, anti-oxidants, anti-ozonants, and/or ultraviolet absorbers.

"Stabilizer-bound latex particulate(s)" refers to one or more image-stabilizers that are chemically or physically associated or entrapped within a hydrophobic polymeric particle(s) of high molecular weight. The latex particulate itself can be from 10 nm to 2 µm in size (or from 100 nm to 400 nm, in another embodiment) and can have a weight average molecular weight from about 10,000 Mw to 10,000,000 Mw (or from about 30,000 Mw to 3,000,000 Mw, in another embodiment). Typically, the stabilizer-bound latex particulate(s) can be present in a colorant-containing liquid vehicle at from 0.5% to 10% by weight to form an ink-jet ink in accordance with principles of the present invention. Additionally, stabilizer-bound latex particulate(s) can be polymerized alone, or can be randomly polymerized with other monomers. Further, crosslinking can be present as well.

"Stabilizing moiety" refers to functional groups that provide image stabilization properties. Such moieties can be covalently attached to the latex particulate, or can be an image-stabilizing portion of a stabilizing agent. Amines attached to the latex particulate directly or through a spacer grouping are an example of a stabilizing moiety.

"Stabilizing agent" refers to compositions that can act as image stabilizer. In one embodiment, the stabilizing agent can be bound to a latex particulate by entrapment within the particulate, not by covalent attachment. Alternatively, a stabilizing agent can be attached to a latex particulate.

"Precursor" includes organic groups that can be attached to a polymerizable or vinylic monomer during free-radical polymerization, but do not substantially interfere with the polymerization process. However, precursors can also be readily separated after polymerization to form a stabilizing agent and/or a stabilizing moiety.

"Image durability" refers to the ability of a printed image to resist change over time or in response to environmental challenges. Such durability factors include but are not limited to lightfastness, humidfastness, gas fade resistance, heat resistance, waterfastness and smearfastness.

With these definitions in mind, the present invention can include a method of associating stabilizer functionalities with latex particulates. The method can comprise forming a stabilizer precursor-containing monomer by coupling a polymerizable monomer (such as a monomer comprising a vinylic functionality) with a stabilizing agent reactive with the polymerizable monomer, thereby forming a stabilizer precursor-containing monomer. In one embodiment, after coupling, the steps of polymerizing the stabilizer precursor-containing monomer to form a stabilizer precursor-containing latex particulate, and subsequently decoupling the stabilizer precursor within the latex particulate to form an associated latex particulate and stabilizing agent can be carried out. Optionally, multiple monomers can be used and randomly polymerized therein, and crosslinking can be carried out.

With this method, the polymerizable monomer can comprise an isocyanate moiety in one embodiment. Therefore, when the stabilizing agent comprises a —NH, —SH, or —OH functionality, and the coupling occurs by reaction between the isocyanate moiety and the —NH, —SH, —OH, or —CH functionality, the isocyanate moiety and the —NH, —SH, —OH, or —CH functionality are blocked from interfering with the polymerizing step. The stabilizing agent, optionally, can further comprise an electron-withdrawing group attached to the functionality. Additionally, the step of polymerizing can include random polymerization of the polymerizable monomer with at least one additional monomer. Decoupling can be carried out by the use of heat and/or water in some embodiments.

The decoupling can produce a stabilizing moiety covalently bound to the latex particulate. In another embodiment, the decoupling can cause the stabilizing agent to become entrapped in the latex particulate. In another embodiment, both can occur.

A stabilizer-bound latex particulate is also provided for improving image durability such as humidfastness and lightfastness in ink-jet printing applications. The stabilizer-bound latex particulate can comprise a latex particulate configured for inclusion in an ink-jet ink to provide improved humidfastness of an image printed by the ink-jet ink, wherein the latex particulate has a molecular weight from 10,000 Mw to 10,000,000 Mw, and has a particle size from 10 nm to 2 μm. Further, an image stabilizer configured for improving durability of the image can be bound to the latex particulate. In one embodiment, the image stabilizer can be a stabilizing moiety covalently bound to the latex particulate. In another embodiment, the image stabilizer can include a stabilizing agent entrapped within the latex particulate. In another embodiment, the image stabilizer can include both a stabilizing moiety covalently bound to the latex particulate, and a stabilizing agent entrapped within the latex particulate.

As will be described in greater detail below, the image stabilizer bound to the latex particulate can be prepared in-situ, after polymerization of the latex particulate, thereby alleviating problems associated with image stabilizer interference with free-radical polymerization. The stabilizer-bound latex particulate can include multiple monomers being randomly polymerized, and/or can be crosslinked.

The association of an image stabilizer and a latex particle can be highly desirable, as a resultant print film or coating can associatively combine a colorant and the stabilizer. Prior to the present invention, the combining of a latex particle and a stabilizer has been difficult, as the preparative chemistry of latex particles are often incompatible with stabilizing agents and/or stabilizing moieties. For example, small micron or submicron latex particles are most successfully formed by free radical emulsion polymerization of vinylic monomers. Conversely, image stabilizers are typically designed to quench such free radicals. Thus, the addition of stabilizers to an ink composition containing a latex monomer mix, with efficacies and proportions necessary to substantially effect print color stability, can prevent appropriate monomer polymerization.

To provide an example, the presence of surface amines on latex particles can be highly desirable for association with certain molecules, such as many dyes and stabilizing salts. The high nucleophilicity of primary and secondary amines can allow preferential surface reactions in a latex aqueous solution without adverse competition with water. However, a clean and effective means of producing a primary or secondary amine on a free radical polymerized latex particle has not been previously demonstrated, particularly in the ink-jet ink arts. For example, vinylic monomers having primary and secondary amines are highly unstable. Further, amines readily react with vinyls through Michael addition, destroying the ability of the monomers to polymerize properly.

Polyvinyl amines are typically prepared commercially by polymerization of vinyl formamide, with subsequent acid reduction to a polyvinyl ammonium salt. A similar product may be prepared through polymerization of a salted vinylic amine monomer. Neither monomer, however, is particularly useful for latex polymerization, as each is sufficiently water soluble to prevent inclusion in the organic phase of the emulsion that forms the latex particle. Alternatively, monomers containing an alkylchloride functionality may be freely polymerized and subsequently aminated with ammonia or amine solvents to form latex amines. Such amination, however, sequentially forms higher classes of amines (in the order primary, secondary, tertiary and ammonium salt) in which each successive step crosslinks the latex, vitiating its ability to form desired protective films over ink-jet produced images.

A goal of many ink and paint films is long-term color durability under a variety of ambient lighting conditions. Commercial free-radical inhibitors, anti-oxidants, anti-ozonants, and other stabilizers are commonly added to ink and paint formulations to extend the color life of incorporated dyes and pigments. When chemically associated with the colorant, such stabilizers have been known to appreciably retard color degradation by blocking free-radical and/or oxidative reactions that cause color and polymer degradation.

The present invention provides a novel means to incorporate significant photo stabilizing function to latex particles. This can be done without detriment to latex polymerization chemistry and process. Specifically, a novel monomer having a stabilizer precursor can be polymerized as part of an overall latex particle monomer mix. The precursor that can be used has little or no free radical quenching properties. Therefore, the precursor does not substantially disrupt the formation of latex particles. Once the particle polymerization reaction has occurred, the latex can further be processed, such as by adding heat and/or water, to generate (or regenerate) the stabilizer from the precursor in-situ. The stabilizer may be chemically bonded to the latex polymer, e.g., stabilizing moiety, and/or may be entrapped within the latex particle, e.g., stabilizing agent. By these compositions, systems, and methods, the colorant and stabilizer can associate within a print film as the latex coagulates during the drying of the print film.

An illustrative example in accordance with an embodiment of the present invention is provided in Formulas 1a-1d below:

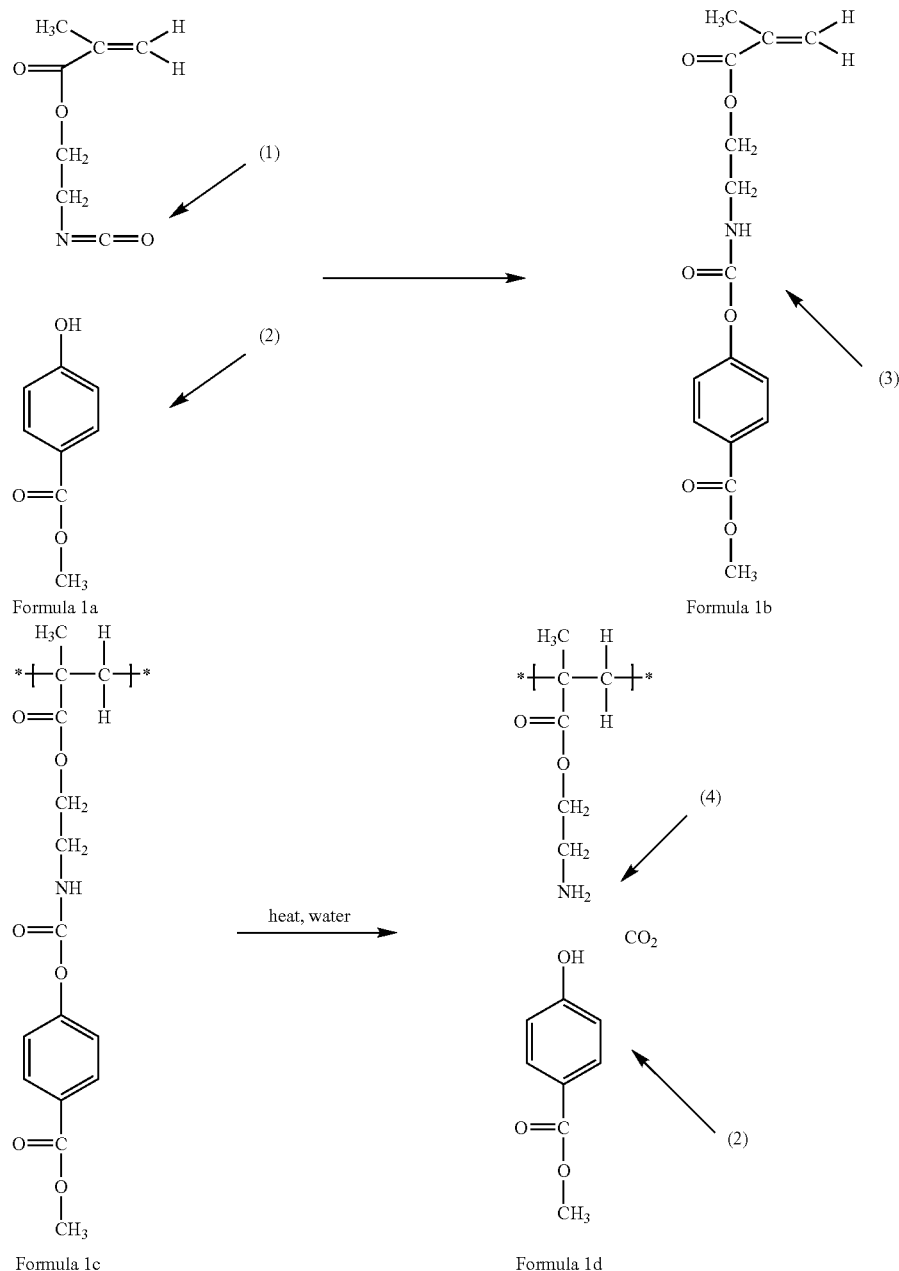

Formula 1a
Formula 1b
Formula 1c
Formula 1d

Formulas 1a-1d above show an example of a general reaction sequence of monomer preparation, free-radical polymerization, and latex in-situ stabilizer generation of this invention. In Formula 1a, 2-isocyanatoethyl methacrylate (Aldrich) is the vinylic isocyanate (1). The stabilizing agent (2) is 4-hydroxy methylbenzoate prepared through the condensation of 4-hydroxy benzoic acid (Aldrich) and methanol. In Formula 1b, the isocyanate and phenol stabilizer are reacted to form a weak carbamate (3). Through the reaction, the isocyanate and stabilizer functionalities are mutually reacted out in the formation of the carbamate, allowing the resultant methacrylate monomer to freely enter into free radical polymerization with other unspecified monomers to form the desired latex polymer, shown in Formula 1c. The brackets indicate the location of polymerization, which can be with other monomers, such as to form a randomly polymerized copolymer. The portion of the composition that is protected from polymerization by the carbamate bond can be referred to as the precursor. The resultant latex (which includes the precursor) is subsequently heated to unblock the isocyanate which immediately reacts with water in the latex solution to form a primary amine stabilizing moiety (4), liberating carbon dioxide as shown in Formula 1d. Additionally, the stabilizer precursor moiety separation regenerates the added stabilizing agent (2) of Formula 1a (which becomes trapped within the latex particle). Carbon dioxide is liberated as a by-product.

The composition formed as shown in Formula 1d provides two photo-stabilizing functionalities. First, a primary amine stabilizing moiety is formed that is covalently attached or covalently bound to the latex particle. Second, 4-hydroxy benzoic acid stabilizing agent is regenerated and becomes entrapped within, but not covalently attached to, the latex particulate. The precursor is in a form that protects both of these functionalities during polymerization, and upon the addition of water and heat, both functionalities are liberated and bound to the latex particulate. In this embodiment, rather than having a single functionality present that acts as a stabilizer, two types of image stabilizers are generated in-situ that can affect long-term image durability properties of an ink-jet ink, other ink, or paint in which the composition is used. Though Formulas 1a-1d above provide an illustrative example of the present invention, other embodiments are possible, some of which will be described herein.

In more general terms, a precursor composition can comprise a vinylic isocyanate reacted with a phenol, thiophenol, or amine functional stabilizing agent (such as a hindered amine light stabilizer). In general, such reactions form weak carbamate, thiocarbamate, or urea-type bonds, respectively, that are readily dissociated at elevated temperature to regenerate the stabilizing agent and the isocyanate. If water is added, the regenerated isocyanate can then immediately react with water entrapped within an aqueous latex particle to form a primary amine stabilizing moiety and carbon dioxide. The water reaction can be dominant, and can force a stoichiometric conversion of the precursor to a desired stabilizer. The generated amine-stabilizing moiety can act both as a potent free-radical quencher, and as a reactive group that allows covalent latex surface attachment of other moieties, such as a colorant, as well as surface cation generation. Additionally, such a reaction allows a stabilizer to form within a latex reaction bath, without harmful reaction bi-products.

In one embodiment, a vinylic precursor that can be used includes that shown in Formula 2 below:

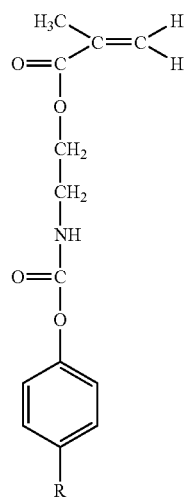

Formula 2 where R can be H, or preferably, R can be an electron withdrawing group (in addition to the phenyl ring) such as an ester.

Stabilizing agents used alone, or in conjunction with dyes, are known in the ink-jet ink arts. For example, U.S. Pat. No. 5,892,037, which is incorporated herein by reference, provides a list of stabilizers that can be used. Such known stabilizers include, but are not limited to alkylated monophenols, alkylthiomethylphenols, hydroquinones, tocopherols, hydroxylated thiodiphenyl ethers, alkylidenebisphenols, hydroxybenzylated malonates, aromatic hydroxybenzyl compounds, triazine compounds, benzylphosphonates, acylaminophenols, phenol esters, amides, hindered amines, oxamides and phenol triazines. More generally, suitable stabilizing agents can include free radical inhibitors, antioxidants, and/or antiozonants containing one, and alternatively more than one functional amine, phenol, or thiophenol. Some phenol stabilizers that can be used include alkylated monophenols such as 3,5 di-terbutyl phenol and phenolic esters such as 4-hydroxy methylbenzoate. Some amines that can be used include sterically hindered amines such as 2,2,6,6 tetramethyl piperidine and diisopropylamine. In general, any stabilizing agent having a stabilizing functional group (e.g. —NH, —SH, —OH, —CH) that is reactive with an isocyanate is within the scope of this invention.

Examples of common isocyanate blocking agents (including blocking agents that are also stabilizing agents) that can be used in accordance with the present invention can include phenols, thiophenols, pyridinols, oximes, amides, imides, imidazoles, pyrazoles, triazoles, and amines. In each of these examples, isocyanate is blocked through a reaction with an —OH, —SH, or —NH group on the blocking agent. Certain acidic methylene compounds, such as malonic esters, are also used and can block through the reaction with its —CH group, e.g., $HO_2CCH_2$—CH—$(OH)CO_2H$. The general isocyanate blocking reaction is provided as Formula 3 below:

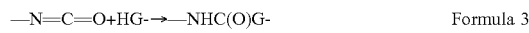  Formula 3 where G represents an oxygen, sulfur, nitrogen, or carbon atom.

As would be known by one skilled in the art, the reactive groups —NH and —CH are each missing valence groups as represented. It is to be understood that —NH will include an additional valence group, and —CH will include two additional valence groups. The dash (—) indicates the functionality it is associated with is part of a larger molecule. For example, —N=C=O can be included as part of $CH_2$=CH $(CH_3)(O)OCH_2CH_2N$=C=O, such as shown in Formula 1a. Additionally, in one example, HG- can be part of 4-hydroxy methylbenzoate, also shown in Formula 1a. Only the blocking reaction portion of the composition is shown in Formula 3. This reaction is reversible at elevated temperature to unblock the isocyanate. The unblocking temperature is determined, in large part, by the chemistry of the blocking agent, and can usually be from 70° C. to 200° C. Blocked isocyanates are most commonly used in polymeric systems, wherein the isocyanate is blocked until the polymer is cast, then unblocked at elevated temperature to crosslink the polymer with reactive groups, e.g. hydroxides, positioned along the polymer. In many instances, a crosslinking reaction is significantly inhibited by competition from the blocking agent to re-react with the unblocked isocyanate.

The present invention provides the use of blocked isocyanates, as many isocyanate blocking agents have stabilizer functionality. Phenols, thiophenols, and hindered amines, are each isocyanate blocking agents and potent stabilizing agents. Furthermore, more potent stabilizing agents tend to have lower isocyanate unblocking temperatures. For example, para-substituted phenols show lowered unblocking temperatures and improved color stabilization as such a substituent tends to be more electron withdrawing. Hindered amines also have lower unblocking temperatures and good color stabilization properties by comparison to non-hindered amines. Para substituted phenols, such as hydroxy benzoic esters, and hindered amines, such as 2,2,6,6-tetramethylpiperidine, are two of the more potent known stabilizers used in the industry, and can be used in accordance with the present invention.

In the state shown in Formula 3, the isocyanate is blocked from hindering a polymerization reaction of a latex particulate, and further, the added stabilizing agent is also blocked from hindering the polymerization of the latex particulate. Thus, in the state shown by the reaction product of Formula 3, a stabilizer precursor can be said to be formed (which can be decoupled after polymerization to form active stabilizer moieties).

The present invention disrupts the ability of a stabilizing agent to re-react with the unblocked isocyanate through formation of an amine, a second potent stabilizer. By adding heat and water to the reaction product of Formula 3, an amine ($—NH_2$) is formed that is covalently bound to a polymerized latex particulate, and the stabilizing agent is regenerated to be entrapped by the latex particulate. A possible reaction scheme for this process can be given by Formula 4 below:

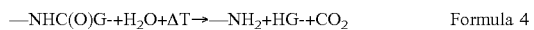

Formula 4 where G represents an oxygen, sulfur, nitrogen, or carbon atom, and $\Delta T$ represents added heat that is sufficient to separate the precursor as shown, but not great enough to denature at least one of the image stabilizers. Again, a dash (—) indicates the functionality it is associated with is part of a larger molecule. In the above reaction scheme, water can be introduced, in this case, by unblocking an isocyanate while the free-radical polymerized latex particles are dispersed in water solution, such as within a latex reaction bath. Water can then be absorbed throughout the latex particle, and can be more abundant and more mobile than the stabilizer. Once unblocked, i.e., precursor portion decoupled, the isocyanate can immediately react with water to form the amine, thereby vitiating the ability of the blocking agent to re-block. While not wishing to be bound by a particular reaction mechanism theory, it is believed that elimination of the competitive re-block reaction lowers the effective unblocking temperature of the isocyanate for some blocking agents. Higher unblocking energy could, otherwise, be required to drive the reaction equilibrium toward the unblocked condition and to mobilize the stabilizing agent away from the unblocked isocyanate.

In another embodiment of the present invention, unlike that shown in Formulas 1a to 4, the isocyanate and stabilizer product may include no vinylic functionality, or other polymerizable functionality whatsoever. In this instance, a stabilizer blocked isocyanate can be dissolved or dispersed in a monomer mix, and does not participate in the free-radical polymerization of the latex. Instead, the stabilizer can simply be entrapped within the latex particle. Such a stabilizer blocked isocyanate can be represented by the example provided by the reaction product of dodecyl isocyanate and 2,2,6,6-tetramethylpiperidine. When unblocked, such as by adding heat to a polymerized latex particulate, the stabilizer blocked isocyanate can form dodecyl amine and the same 2,2,6,6-tetramethylpiperidine, both of which are sufficiently hydrophobic to remain entrapped within the latex particle.

In another embodiment, either or both the isocyanate and stabilizing agent reactant molecules can have, optionally, a vinylic functionality. In general, even more stabilizer-blocked isocyanate can be incorporated into a latex particle when the stabilizer-blocked isocyanate participates in the latex polymerization reaction. In the present invention, vinylic functionality is generally defined as a chemical group capable of entering free radical polymerization. Such a chemical group is exemplified by, but not limited to, acrylates, styrenes, vinyl ethers, and other ethylene reactive moieties. In the instance in which the stabilizer monomer contains only one vinylic group, the polymerized monomer will unblock to form a polymer-attached amine or polymer attached stabilizing agent, depending on which entity is more directly attached to the vinyl group. The remaining entity will not be chemically bonded within the latex particle, and can either be entrapped within the latex polymer matrix or leach out of the latex, depending on solubility.

When both the isocyanate and stabilizing agent reactants each have an attached vinyl group, the reaction product can form a dimer or multimer allowing monomer polymerization across multiple polymer strands. The polymerized precursor-containing stabilizer monomer can unblock to form a polymer-attached amine and a second polymer attached stabilizing moiety (which can be an attached stabilizing agent). Still further, a multi-functional isocyanate or multi-functional stabilizing agent may be used. For example, two vinylic isocyanates may be reacted to a single di-functional stabilizing agent, such as hydroquinone.

In one embodiment, a vinylic isocyanate of the present invention can have a general structure, which is illustrated as Formula 5 below:

Formula 5 where $R_1$, $R_2$, and $R_3$ can independently be hydrogen, phenyl, 1-20 carbon substituted or unsubstituted alkyl, substituted or unsubstitued aryl, or halogen; and $R_4$ can comprise an electron withdrawing group, such as an ester, ether, or phenyl ring, attached to the unsaturated carbon. Optionally, though not shown, a linkage or spacer grouping can be attached between the $R_4$ and the isocyanate. As is well known in the chemical art, the $R_{1-4}$ elements define the vinyl group, fundamentally represented by the double bonded carbon atoms. It is well known in the art that the electron-withdrawing group is used to increase free radical reactivity of an unsaturated carbon-carbon double bond. It is further well known in the art that moieties other that those given for $R_{1-4}$ can be used without departing from the teachings of this invention. Vinylic isocyanates are well known in the art and include, for example, 2-isocyanatoethyl methacrylate and vinyl isocyanate. In the case of vinyl isocyante, the isocyanate is directly attached to the unsaturated carbon (eliminating $R_4$).

In general, the reaction of the vinylic isocyanate and a stabilizing agent forms a weak carbamate, thiocarbamate, or urea, depending on whether the stabilizing agent is a phenol, thiophenol, or amine compound, respectively. There are many stabilizer molecules having phenol, thiophenol, or amine groups capable of forming such reaction products with isocyanates. The choice of stabilizing agent can be made based upon resultant stabilizer monomer solubility in a latex monomer mix, hydrophobicity, reaction and unblocking temperatures, and stabilizing agent efficiency for a particular application.

In some embodiments, the reaction temperature that forms a stabilizing agent can be designed to be sufficiently low to avoid untimely polymerization of the vinyl group. If too high for a desired reaction, the temperature can be lowered by incorporation of certain catalysts such as tertiary amines or organotin compounds. Likewise, the unblocking temperature, or the temperature at which the stabilizing agent and isocyanate are regenerated, can be kept below the boiling point of water to allow stabilizing agent regeneration in a latex reaction bath. Again, catalysts such as tertiary amines or organotin compounds can be used for this purpose. Catalysts and catalyst concentrations for altering the blocking and unblocking temperature of isocyanates and blocking agents are well known in the art. Examples of suitable cataylsts include dibutyltin dilaurate and triethylamine. Such catalysts can be added to a reaction mixture at from 0.05%-1.0% by weight concentration. In another embodiment, the unblocking temperature may be selected at a higher temperature, requiring that the stabilizer be regenerated under less optimum conditions, e.g. after print film formation. Stabilizing agent hydrophobicity can be considered to assure that the stabilizing agent does not leach out of the latex particle or print film.

Many variations of the teachings of this invention are possible. The precursor monomer, for example, may optionally comprise multiple vinyl functionality to bond the regenerated stabilizing agent to the latex polymer. In such an embodiment, a stabilizing agent-containing vinylic functionality can be used. A dimer produced through the reaction of a vinylic isocyanate and the reaction product of a vinylic acid chloride (e.g. acryloyl chloride) and 2,2,6,6-tetramethyl-4-piperidinol is an example of such multiple vinyl functionality. In this case, the dimer serves to crosslink adjacent polymer strands during latex particle formation. The crosslink is broken upon subsequent heating to form primary amine and stabilizer side chains on the prior crosslinked polymer strands. In another embodiment, the precursor-containing monomer can comprise the reaction product of a vinylic stabilizing agent and a non-vinylic isocyanate (e.g. dodecyl isocyanate). In each example, the stabilizer monomer polymerizes during latex formation and forms stabilizing agent and amine functional entities during post-latex formation heating.

As describe previously, the present invention provides a unique means to incorporate primary amines within latex chemistry. This provides a unique ability to additionally react these in-situ-formed primary amines to form alternate amine types and functional couplings. Alternate amine types include, for example, latex surface salts for particle dispersion, and hindered amine stabilization.

The following examples typify this element of the invention. Surface amines can be salted by addition of certain acids, such as hydrochloric, nitric or carboxylic acid, to the reaction bath. In such reactions, a primary amine can be readily converted to its ammonium salt form. Latex amines can be reacted with alkyl halides to form secondary and hindered amines. For example, primary amines may be reacted with 2-chloropropane to produce hindered amine stabilizer. Hindered amines are believed to be regenerative free-radical scavengers. The amine reactant can then be introduced into the monomer mix or infused through the latex particle through soaking. Surface amines can be, for example, used to attach steric stabilizers to the latex. For example, a poly(ethylene glycol) acrylate may be introduced into the latex solution and reacted to the latex surface through the condensation (Michael addition) reaction of the acrylate and surface amine.

In any of the above-described embodiments, the unblocking reaction can optionally take place at any time after latex polymerization, including after the latex is printed, cast, or otherwise coated. For example, regenerated isocyanate can be used to crosslink the latex print film in a more conventional sense for added durability. In this instance, a monomer (or monomers) containing moieties reactive with isocyanates (e.g. alcohols such as in hydroxyethyl acrylate monomer) can be employed in the monomer mix. This embodiment departs from the concept of simultaneous formation of stabilizer that is used to protect the print film against oxidative degradation.

For some applications, it can be desirable to create latex polymers having covalently attached amines wherein stabilizer functionality is not necessary. In such instances, the stabilizers described above may be substituted by a common isocyanate blocking agent. A common example of such an isocyanate blocking agent is methylethyl ketoxime. This embodiment provides that the blocked isocyanate is used to produce an in-situ amine within the latex after free-radical latex polymerization.

The present invention has benefit to a wide range of latex polymer applications for which color and polymer stability against photo-oxidation and free-radical degradation are desired. Such applications include, but are not limited to inks, paints, and coatings. If used in an ink, such as an ink-jet ink, the stabilizer-bound latex particulates can be incorporated with a colorant and an appropriate ink-vehicle to provide an improved ink-jet ink composition. It is further noted that the teachings of the present invention can extend beyond latex polymers and can include, for example, all polymer systems formed through free-radical polymerization of monomers. This includes water-based and solvent-based polymer systems and solid plastic polymers (e.g. polyacrylates, polystyrenes). The isocyanate blocked stabilizers in plastic polymers can be unblocked to regenerate the stabilizer when molded or extruded at the high flow temperature of the plastic. Plastic products formed from such plastics (e.g. toys, furniture, windows) may be given extended life against discoloration and structural deterioration through the incorporation of the blocked stabilizers of the present invention.

EXAMPLES

The following examples illustrate embodiments of the invention that are presently known. Thus, these examples should not be considered as limitations of the present invention, but are merely in place to teach how to make the best-known compositions of the present invention based upon current experimental data. As such, a representative number of compositions and their method of manufacture are disclosed herein.

Example 1

A control latex was formed using a monomer emulsion of 102.5 g methyl methacrylate (Aldrich), 120.0 g hexyl acrylate (Aldrich), 25 g mono-methylacryloyloxyethyl succinate (Aldrich), 2.5 g ethylene glycol dimethacrylate (Aldrich), and 1.0 g isooctylthioglycolate (Avecia) mixed and sheared gently with 85 g water and 20.8 g Rhodafac™ (Rhodia). A reaction bath containing 725 g water was heated to 90° C. To the reaction bath, 0.87 g potassium persulfate dissolved in 100 g water was added dropwise at a rate of 3 ml/min with stirring. The monomer emulsion was subsequently added to the reaction bath dropwise over a period of 30 minutes. The reaction mixture was maintained at 90° C. for 2 hours and allowed to cool down. When cooled to 50° C., the reaction mixture was buffered to pH 8.5 through the addition of 23 g of 17.5% potassium hydroxide solution. The reaction mixture was filtered with a 200 mesh filter to obtain stable polymer latex particles with an average particle size of 230 nm.

Example 2

The composition of Example 1 was duplicated with the addition of 4-hydroxy benzoic acid, a very potent stabilizer, to the monomer mix. A monomer premix was formed with 4.25 g methyl methacrylate, 4.25 g hexyl acrylate, 1.0 g mono-methacryloyloxyethyl succinate, 0.1 g ethylene glycol dimethacrylate, 0.4 g hyroxybenzoic acid, and the premix was emulsified in 7 g water with 0.25 g Rhodafac. The reaction bath consisted of 30 g water with 0.05 g potassium persulfate initiator. Following the addition of the monomer emulsion, the reaction mixture was maintained at 90° C. for 1.5 hour and allowed to cool to ambient temperature. No latex was formed.

Example 3

A stabilizer monomer was synthesized from the condensation reaction of isocyanatoethyl methacrylate and 4-hydroxy methylbenzoate (the ester form of the stabilizer used in Example 2). About 12 g methyl hydroxybenzoate was dissolved in 5 ml of dichloromethane. To this solution, 15 ml of isocyanatoethyl methacrylate (Aldrich) and 1 ml of triethylamine was added. The reaction mixture was stirred at room temperature for 16 hours. The product mixture was washed with hexane to remove unreacted isocyanate. About 23.5 g of stabilizer monomer was produced.

Example 4

A latex composition comprising 85% methyl methacrylate and 15% of the stabilizer monomer of Example 3 was prepared. An emulsion was prepared by mixing 5.66 g of methyl methacrylate and 1.0 g of the stabilizer monomer in 1.3 g water containing 0.5 g of Rhodafac RS710. The separately prepared water bath contained 20 ml water with 0.07 g potassium persulfate stirred at 90° C. The monomer emulsion was added over 30 minutes to the bath and the reaction mixture stirred at 90° C. for one hour, then cooled to ambient temperature to obtain the latex. The latex particle size was 178 nm. The isocyanate blocked the free-radical quenching function of the stabilizer.

Example 5

The hydroxy methyl benzoate stabilizer of Example 4 was regenerated in-situ within the formed latex by heating the latex at 75° C. for 2.5 hours in the presence of triethylamine catalyst. About 13 g of the latex obtained in Example 4 was mixed with 80 mg triethylamine. The latex mixture was then heated for 2.5 hours at 75° C. Regeneration of the hydroxy methylbenzoate stabilizing agent and creation of the primary amine stabilizing moiety was confirmed by IR spectroscopy and ninhydrin solution analysis. Cleavage of the carbamate blocking group was found to be complete and stoichiometric via NMR analysis.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. A method of associating an image stabilizer with a latex particulate for stabilizing a colorant, comprising:
   (a) forming a precursor stabilizer-containing monomer by coupling a polymerizable monomer having an isocyanate moiety with a stabilizing agent having an —NH, —SH, —OH, or —CH funtionality, wherein the coupling occurs by reaction between the isocyanate moiety and the —NH, —SH, —OH, or —CH functionality;
   (b) polymerizing the precursor stabilizer-containing monomer in an emulsion to form a precursor stabilizer-containing latex particulate, the isocyanate moiety and the —NH, —SH, —OH, or —CH functionality being blocked from interfering with polymerization; and
   (c) decoupling the stabilizing agent after forming the precursor stabilizer-containing latex particulate to form a latex particulate in solution, said latex particulate having an attached stabilizing moiety, and wherein the stabilizing agent is also present in solution.

2. A method as in claim 1, wherein the stabilizing agent further comprises an electron-withdrawing group attached to the functionality.

3. A method as in claim 1, wherein the polymerizable monomer includes a vinylic functionality.

4. A method as in claim 3, wherein the polymerizable monomer having an isocyanate moiety with a stabilizing agent, and which also includes the vinylic functionality is as follows:

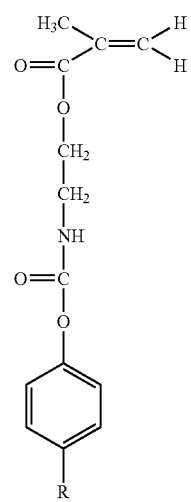

where R is H or an electron withdrawing group.

5. A method as in claim 1, wherein the precursor stabilizer-containing monomer is provided by a condensation reaction between a vinyl isocyanate and a hindered amine stabilizing agent.

6. A method as in claim 1, wherein the step of polymerizing includes random polymerization of the polymerizable monomer with at least one additional monomer.

7. A method as in claim 1, wherein the decoupling is by the use of a member selected from the group consisting of heat, added water, and combinations thereof.

8. A method as in claim 1, wherein the image stabilizer is covalently bound to the latex particulate.

9. A method as in claim 1, wherein the image stabilizer is entrapped in the latex particulate.

10. A method as in claim 1, further comprising the step of crosslinking the latex particulate.

11. A method as in claim 1, wherein the image stabilizer comprises an —NH functionality.

12. A method as in claim 1, wherein the image stabilizer comprises an —SH functionality.

13. A method us in claim 1, wherein the image stabilizer comprises a —CH functionality.

* * * * *

UNITED STATES PATENT AND TRADEMARK OFFICE
CERTIFICATE OF CORRECTION

| | | |
|---|---|---|
| PATENT NO. | : 7,358,301 B2 | Page 1 of 1 |
| APPLICATION NO. | : 10/322032 | |
| DATED | : April 15, 2008 | |
| INVENTOR(S) | : Kent Vincent et al. | |

It is certified that error appears in the above-identified patent and that said Letters Patent is hereby corrected as shown below:

In column 16, line 7, in Claim 1, delete "funtionality" and insert -- functionality --, therefor.

In column 18, line 1, in Claim 13, delete "us" and insert -- as --, therefor.

Signed and Sealed this

Eighteenth Day of May, 2010

David J. Kappos
*Director of the United States Patent and Trademark Office*